(12) United States Patent
Chillscyzn et al.

(10) Patent No.: US 11,396,127 B2
(45) Date of Patent: Jul. 26, 2022

(54) SYSTEMS AND METHODS FOR ELECTROPHOTOGRAPHY-BASED ADDITIVE MANUFACTURING OF PARTS UTILIZING MULTIPLE PRINTING PATHS

(71) Applicant: Evolve Additive Solutions, Inc., Minnetonka, MN (US)

(72) Inventors: Steven A. Chillscyzn, Victoria, MN (US); Arun Chowdry, Maple Grove, MN (US); J. Samuel Batchelder, Somers, NY (US)

(73) Assignee: Evolve Additive Solutions, Inc., Minnetonka, MN (US)

( * ) Notice: Subject to any disclaimer, the term of this patent is extended or adjusted under 35 U.S.C. 154(b) by 134 days.

(21) Appl. No.: 16/634,758

(22) PCT Filed: Jul. 31, 2018

(86) PCT No.: PCT/US2018/044618
§ 371 (c)(1),
(2) Date: Jan. 28, 2020

(87) PCT Pub. No.: WO2019/028033
PCT Pub. Date: Feb. 7, 2019

(65) Prior Publication Data
US 2020/0198229 A1  Jun. 25, 2020

Related U.S. Application Data

(60) Provisional application No. 62/539,118, filed on Jul. 31, 2017, provisional application No. 62/539,117, filed on Jul. 31, 2017.

(51) Int. Cl.
*B29C 64/147* (2017.01)
*B33Y 10/00* (2015.01)
(Continued)

(52) U.S. Cl.
CPC ......... *B29C 64/147* (2017.08); *B29C 64/379* (2017.08); *B33Y 10/00* (2014.12);
(Continued)

(58) Field of Classification Search
USPC ........................................................ 700/118
See application file for complete search history.

(56) References Cited

U.S. PATENT DOCUMENTS

| 6,206,672 B1 * | 3/2001 | Grenda ............... G03G 15/221 |
| | | 425/174.4 |
| 8,488,994 B2 | 7/2013 | Hanson et al. |

(Continued)

FOREIGN PATENT DOCUMENTS

| DE | 202013011396 | 3/2014 |
| JP | 2017001262 | 1/2017 |

(Continued)

OTHER PUBLICATIONS

"International Preliminary Report on Patentability," for PCT Application No. PCT/US2018/044613 dated Feb. 13, 2020 (9 pages).

(Continued)

*Primary Examiner* — Quana Grainger
(74) *Attorney, Agent, or Firm* — Pauly, DeVries Smith & Deffner LLC

(57) ABSTRACT

An electrostatic-based layer-wise manufacturing system (e.g., 200; 200-1; 250; 282; 300) decouples a layer imaging process from a layer transfusion process. The layer imaging process is performed in a first batch process that is independent from the layer transfusion process that is performed in a second batch process.

14 Claims, 5 Drawing Sheets

(51) Int. Cl.
  *G03G 15/16* (2006.01)
  *G03G 15/22* (2006.01)
  *B33Y 30/00* (2015.01)
  *B33Y 40/00* (2020.01)
  *B29C 64/379* (2017.01)

(52) U.S. Cl.
  CPC ............... *B33Y 30/00* (2014.12); *B33Y 40/00* (2014.12); *G03G 15/1625* (2013.01); *G03G 15/224* (2013.01)

(56) References Cited

U.S. PATENT DOCUMENTS

| | | | |
|---|---|---|---|
| 8,879,957 | B2 | 11/2014 | Hanson et al. |
| 2013/0077996 | A1 | 3/2013 | Hanson et al. |
| 2013/0186549 | A1 | 7/2013 | Comb et al. |
| 2013/0186558 | A1 | 7/2013 | Comb et al. |
| 2015/0273767 | A1* | 10/2015 | Batchelder ............ B29C 64/135 264/401 |
| 2016/0082658 | A1 | 3/2016 | Swartz et al. |
| 2016/0200046 | A1 | 7/2016 | Zeman et al. |
| 2016/0200084 | A1 | 7/2016 | Hays et al. |
| 2017/0192377 | A1 | 7/2017 | Batchelder et al. |
| 2017/0192382 | A1 | 7/2017 | Baecker |
| 2018/0085996 | A1 | 3/2018 | Beier et al. |
| 2020/0198228 | A1 | 6/2020 | Chillscyzn et al. |

FOREIGN PATENT DOCUMENTS

| | | |
|---|---|---|
| JP | 2017165065 | 9/2017 |
| WO | 2017063640 | 4/2017 |
| WO | 2019028030 | 2/2019 |
| WO | 2019028033 | 2/2019 |

OTHER PUBLICATIONS

"International Preliminary Report on Patentability," for PCT Application No. PCT/US2018/044618 dated Feb. 13, 2020 (8 pages).
"International Search Report and Written Opinion," for PCT Application No. PCT/US2018/044613 dated Nov. 15, 2018 (12 pages).
"International Search Report and Written Opinion," for PCT Application No. PCT/US2018/044618 dated Oct. 31, 2018 (12 pages).
"Non-Final Office Action," for U.S. Appl. No. 16/634,748 dated Oct. 18, 2021 (21 pages).

* cited by examiner

SYSTEMS AND METHODS FOR ELECTROPHOTOGRAPHY-BASED ADDITIVE MANUFACTURING OF PARTS UTILIZING MULTIPLE PRINTING PATHS

BACKGROUND

The present disclosure relates to additive manufacturing systems for printing three-dimensional (3D) parts. In particular, the present disclosure relates to electrophotography-based additive manufacturing systems for producing 3D parts, and methods of producing 3D parts using the systems.

Additive manufacturing is generally a process in which a three-dimensional (3D) object is manufactured based on a computer image of the object. A basic operation of an additive manufacturing system consists of slicing a three-dimensional computer image into thin cross sections, translating the result into two-dimensional position data, and feeding the data to control equipment which manufacture a three-dimensional structure in a layer wise manner using one or more additive manufacturing techniques. Additive manufacturing entails many different approaches to the method of fabrication, including fused deposition modeling, ink jetting, selective laser sintering, powder/binder jetting, electron-beam melting, electrophotographic imaging, and stereolithographic processes.

In an electrophotographic 3D printing process, each slice of the digital representation of the 3D part and its support structure is printed or developed from powder materials using an electrophotographic engine. The electrophotographic engine generally operates in accordance with 2D electrophotographic printing processes, using charged powder materials that are formulated for use in building a 3D part (e.g., a polymeric toner material). The electrophotographic engine ("EP engine") typically uses a support drum that is coated with a photoconductive material layer, where latent electrostatic images are formed by electrostatic charging following image-wise exposure of the photoconductive layer by an optical source. (Alternatively, an image may be formed using ionography by direct-writing electrons or ions onto a dialectric, and eliminating the photoconductor, all within the scope of the present invention and within the use of the electrophotography terminology as used herein). The latent electrostatic images are then moved to a developing station where the polymeric toner is applied to charged areas, or alternatively to discharged areas of the photoconductive insulator to form the layer of the charged powder material representing a slice of the 3D part. The developed layer is transferred to a transfer medium, from which the layer is transfused to previously printed layers with heat and/or pressure to build the 3D part.

Electrophotographic 3D printing as part of a manufacturing process can be embedded in a manufacturing flow. However, due to the use of a transfusion process for the manufacture of a part-in-process, significant time can be lost in repeatedly positioning the part for the transfusion step(s). As a result, the EP engine may only be utilized a portion of the time, and the overall processing rate can be low as a result.

SUMMARY

Aspects of the present disclosure are directed to an electrostatic-based layer-wise manufacturing system that decouples a layer imaging process from a layer transfusion process such that the layer imaging process performed in a first batch process that is independent from the layer transfusion process performed in a second batch process.

Other aspects of the present disclosure are directed to an electrostatic-based layer-wise manufacturing system that utilizes a transfer portion and a thermal fusing portion, wherein two mechanically distinct parts are fabricated in parallel processing paths.

Other aspects of the present disclosure are directed to an electrostatic-based layer-wise manufacturing system utilizing thermal fusing, wherein toner images are formed on mobile sheets, and the parts are formed by a sequence of thermal transfer from a sequence of mobile sheets.

Other aspects of the present disclosure are directed to a pod for transporting an additive manufactured part through two or more spatially separated processes, one of those processes being an electrostatic-additive process. The pod comprises a temperature controlled platen and a z-stage.

DEFINITIONS

Unless otherwise specified, the following terms as used herein have the meanings provided below:

The term "copolymer" refers to a polymer having two or more monomer species, and includes terpolymers (i.e., copolymers having three monomer species).

The terms "at least one" and "one or more of" an element are used interchangeably, and have the same meaning that includes a single element and a plurality of the elements, and may also be represented by the suffix "(s)" at the end of the element. For example, "at least one polyamide", "one or more polyamides", and "polyamide(s)" may be used interchangeably and have the same meaning.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

Directional orientations such as "above", "below", "top", "bottom", and the like are made with reference to a direction along a printing axis of a 3D part. In the embodiments in which the printing axis is a vertical z-axis, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, the terms "above", "below", "top", "bottom", and the like are relative to the given axis.

The term "providing", such as for "providing a material" and the like, when recited in the claims, is not intended to require any particular delivery or receipt of the provided item. Rather, the term "providing" is merely used to recite items that will be referred to in subsequent elements of the claim(s), for purposes of clarity and ease of readability.

Unless otherwise specified, temperatures referred to herein are based on atmospheric pressure (i.e. one atmosphere).

The terms "about" and "substantially" are used herein with respect to measurable values and ranges due to expected variations known to those skilled in the art (e.g., limitations and variabilities in measurements).

All references cited herein are incorporated by reference in their entireties.

DETAILED DESCRIPTION

The present disclosure is directed to electrophotography-based additive manufacturing systems for printing 3D parts, and methods of printing 3D parts using the systems. During a electrophotographic 3D part additive manufacturing or printing operation, an electrophotography (EP) engine may develop each layer of the 3D part (and any associated support material) out of a polymeric toner or other powder-based material(s) using the electrophotographic process. The developed layers are then transferred to a transfer medium, which delivers the layers to a transfusion assembly where the layers are transfused (e.g., using heat and/or pressure) to build one or more 3D parts and support structures in a layer-by-layer manner utilizing different paths.

The present disclosure decouples the development of the layers of toner from the EP engines from the transfusion of the layers into a stack to form the 3D part. Decoupling the development of the layers from the transfusion process allows more of the capacity of the EP engines to be utilized because the layers can be developed at a faster rate than the transfer of the layers into the stack Further, utilizing EP techniques for printing one or more 3D parts is a manufacturing process requires the printing to be embedded in a manufacturing flow. From a hardware standpoint, this means enabling more positioning capability of the part-in-process than just back-and-forth through the transfusing step. Also, the maximum processing rate for an EP engine is much greater than that of the transfusion process. As such, decoupling the EP imaging from the transfusion step will increase the overall processing rate.

Previously, it was typical to utilize multiple EP engines with a single belt or other transfer medium and transfusion assembly, and to continually generate images on the transfer medium then transfer each image sequentially onto the build platform to form a part stack (i.e, continuously forming and transferring layers until the 3D part is completed). As previously mentioned, the present disclosure decouples the EP imaging process from the transfusion process by imaging batches of the layers onto separate sheet that are subsequently stored in a pod. The pod is then moved to the transfusion process where the sheets with the imaged layers are transfused as a batch into a stack using heat and pressure to at least print a portion of the 3D pod.

Figure 1:
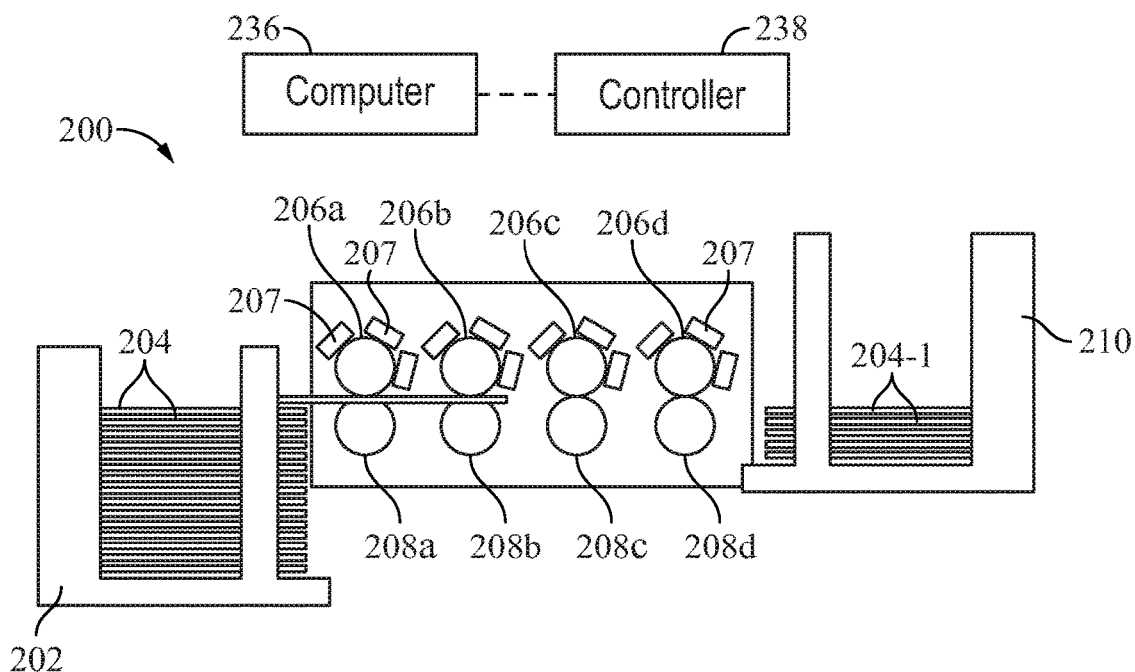
FIG. 1 is a schematic view of an electrophotographic printing unit utilizing a plurality of separate sheets.

Referring to FIG. 1, an embodiment of a portion of an additive manufacturing system is illustrated, showing an imaging system 200 implementing a batch process or method of forming and transferring sheets using a pod system. The system 200 has a supply pod 202 that contains a plurality of individual sheets 204 of a material configured to accept an imaged layer of part material and optionally support material from one or more EP engines 206a, 206b, 206c and 206d, for intermediate storage until a later use is desired. One or more of the EP engines 206a-d, produce a layer 207 of part material from a sliced 3D model and optionally support material where the individual sheets 204 are passed between the engines 206a-d and a biasing roller 208a-d until the sheets 204-1 with the imaged layers 207 are received into a receiving pod 210.

Exemplary materials for the sheets include paper coated with polytetrafluoroethylene (Teflon), fluorinated ethylene propylene coated with polyimide film such as Kapton film, silated silica and graphene on silica. The exemplary materials for the sheets share features having relatively low bonding to a toner, and being conformable to a part surface that is not completely flat. For instance, a wood-pulp paper with a release coating may be sufficient for low temperature plastics. The FEP-on-Kapton is an exemplary composite material that is also used as a transfer belt in EP processes. If glass (silated silica) is thin enough, it becomes flexible; glass can be treated (and re-treated) with a surface release agent. For higher temperature toners, a thinned silicon wafer is low conductivity, mechanically rigid, and coated with a surface-release graphene layer. Any of these can be stacked up in a ream for storage and transport and queuing. For each of the above materials for the sheets, it is contemplated that the sheets could be reused and are not to be incorporated in the 3D part being printed.

In other embodiments, the transfer sheets could also be incorporated as desired into the part without removing the toner layer. For instance, exemplary materials for the transfer sheets that could be incorporated into the 3D part include, but are not limited to, fiberglass, high temperature glass fibers, boron fibers, or carbon fibers.

The sheets can be of any suitable size and thickness. Exemplary thickness ranges from about 0.001 inches to about 0.005 inches. Exemplary size ranges include from about 12 inches by about 12 inches to about 16 inches to about 24 inches.

System 200 also includes a controller 236, which represents one or more processors that are configured to execute instructions, which may be stored locally in memory of the system 200 or in memory that is remote to the system 200, to control components of the system 200 to perform one or more functions described herein. In some embodiments, the controller 236 includes one or more control circuits, microprocessor-based engine control systems, and/or digitally-controlled raster imaging processor systems, and is configured to operate the components of system 200 in a synchronized manner based on instructions received from a host computer 238 or a remote location. In some embodiments, the host computer 238 includes one or more computer-based systems that are configured to communicate with controller 236 to provide the print instructions (and other operating information). For example, the host computer 38 may transfer information to the controller 236 that relates to the sliced layers of the 3D parts and support structures. Controller 236 and computer 238, or other suitably configured controllers or computers, can be used to implement the systems and methods described below.

Figure 2:
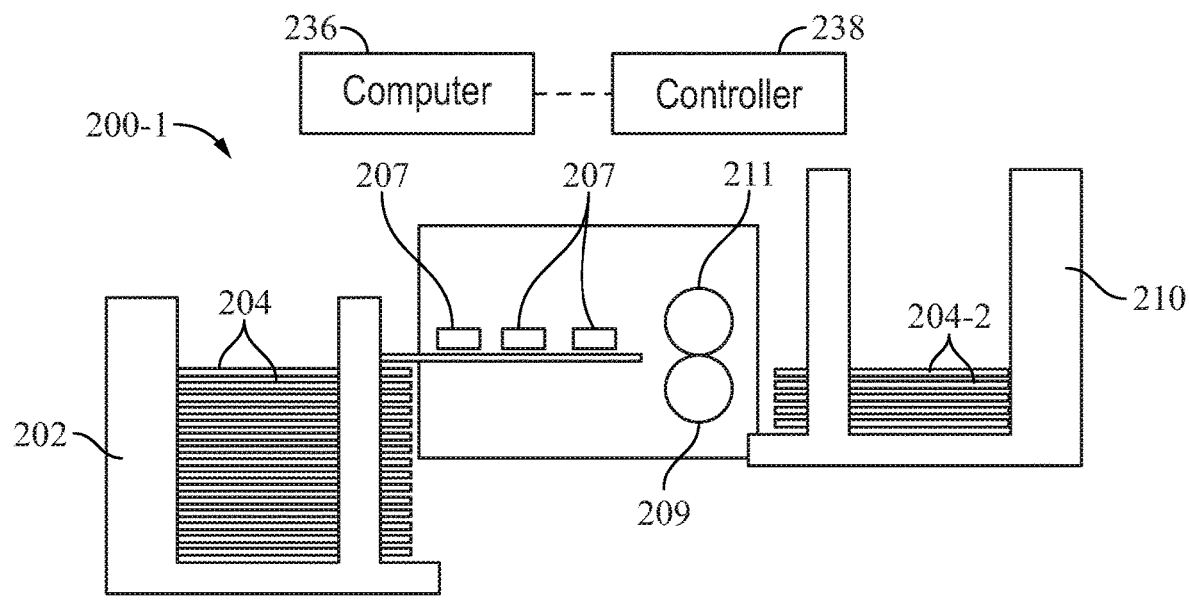
FIG. 2 is a schematic view of an electrophotographic printing unit utilizing a plurality of separate sheets with a planishing unit.

Referring to FIG. 2, in some instances the imaged layers 207 on the sheets 204 are planished to compact the layers, and optionally heat toner particles in a continuously adhered layer, prior to being received in the receiving pod 210. In the additive manufacturing system 200-1 shown in FIG. 2, the EP engines 206a, 206b, 206c and 206d, and biasing rollers 208a-d are omitted for ease of illustration, but should be understood to be included in the process flow before the planisher. In FIG. 2, a sheet 204 having the imaged layers 207 thereon is illustrated being fed into the planisher. A typical planisher includes an upper roller 211 and a lower roller 209 that are spaced apart a selected distance such that the sheet 204 with the imaged layer are compressed to remove voids in the imaged layer. Planishing is optional, but can be beneficial when printing some 3D parts. The sheets 204-2 with the imaged layers planished are received into a receiving pod 210.

Figure 3:
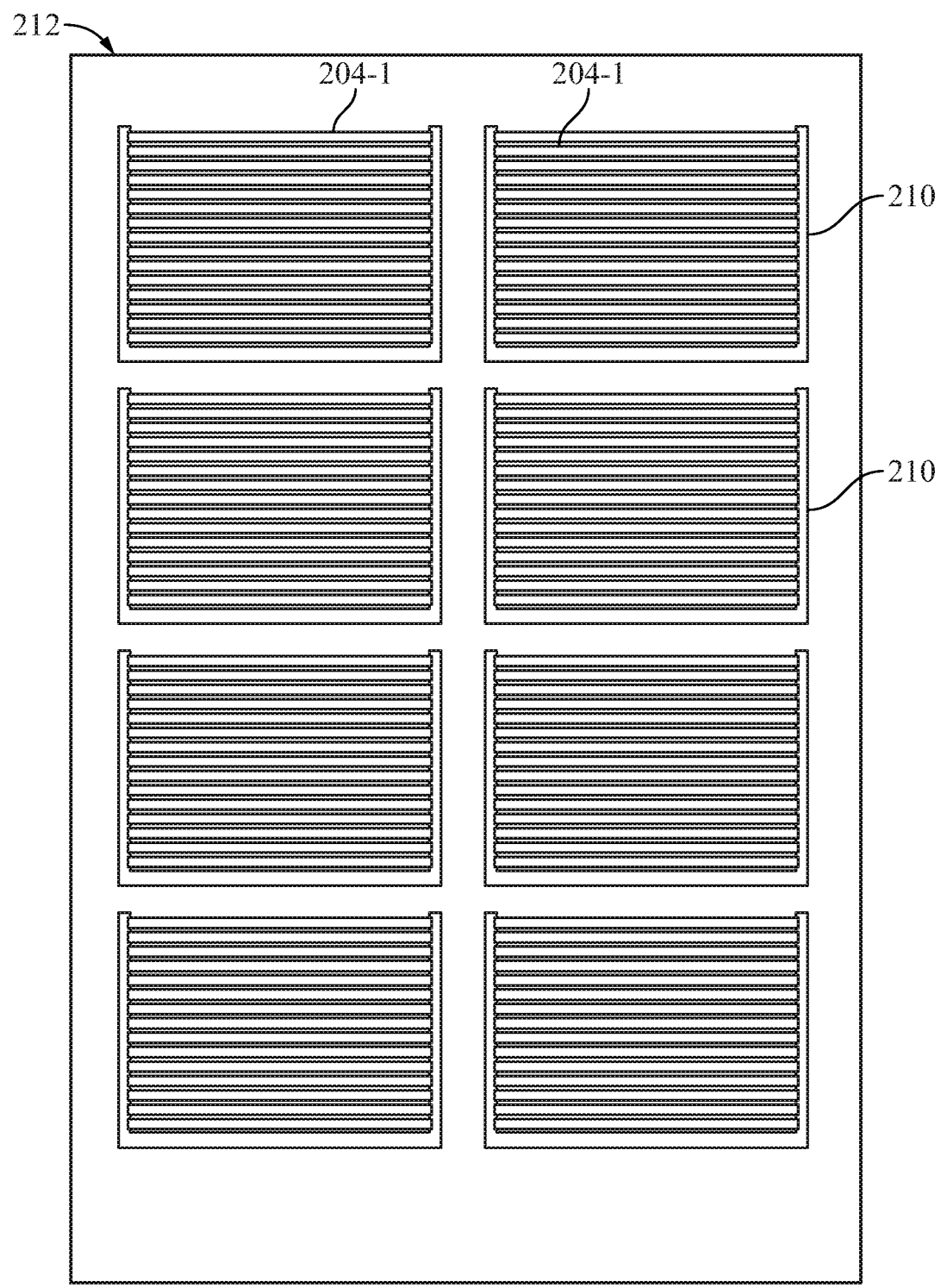
FIG. 3 is a schematic view of drying unit configured to accept one or more pods, each containing a plurality of sheets with imaged layers of material.

Referring to FIG. 3, once the imaged layers for one or more 3D parts have transferred to the plurality of sheets 204 and the plurality of sheets 204-1 (or 204-2) with the imaged layers are stored in the one or more receiving pods 210, the pods 210 with the plurality of sheets 204-1 with imaged layers are placed into a controlled atmospheric container, such as a dryer 212. The dryer 212 removes moisture from the imaged layers (which is useful in the EP engine to image layers) such that vapor is not created when the layers are subsequently heated and transfused to build the 3D part in the layer by layer process. The dryer 212 also prevents the imaged layers of material from accepting moisture from ambient conditions.

Figure 4:
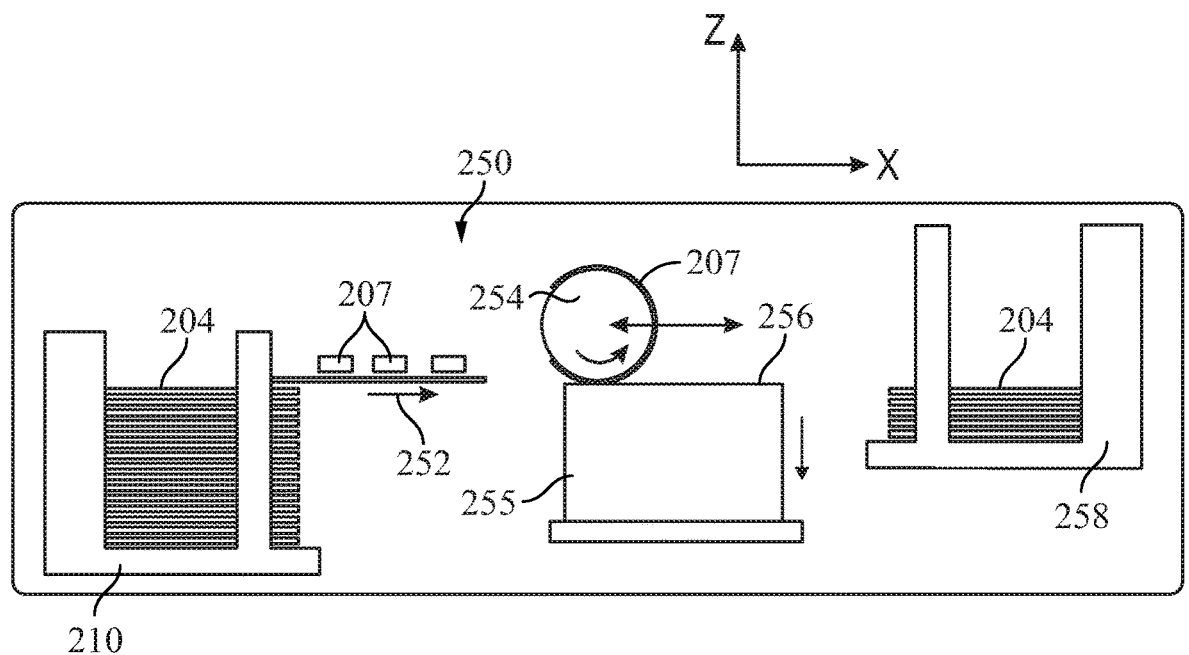
FIG. 4 is a schematic view a transfusing/build process system for manufacturing a 3D part.

Referring to FIG. 4 the pods 210 are moved to a transfuse/build process assembly 250. The sheets 204-1 (or 204-2) with the imaged layers 207 are loaded into a delivery system 252 that forces the sheet 204-1 to a selected location where the sheet 204-1 is clamped to a roller 254. Thereafter, the image layer is heated, fiducials are aligned, the part surface 256 of 3D part 255 is preheated, and the heated image is transfused onto the upper part surface 256 utilizing heat and pressure. After the layer is transfused, the part surface is cooled to remove heat imparted into the part. The sheet 204 (without the imaged layer or layers) is then moved to another pod 258 for future reuse, and possible cleaning prior to reuse. The process is repeated in a sheet by sheet manner until the 3D part 255 is printed. In some instances, the transfuse roller 254 may revolve three times per layer: once to load a sheet, once to transfer the image, and once to unload the sheet. In some configurations, it may be more efficient to move the sheet and roller across the upper part surface 256 than it is to move the part 255 in the x-direction under a fixed roller. However, a stationary roller in x, y and z is also contemplated.

In an exemplary system, a typical 3D part can require about 3,000 layers to complete the printing process. A pod may contain about 50 sheets, in an exemplary system. However, pods having a capacity of more or less than 50 sheets are also contemplated. A typical part, requiring about 3,000 layers may take about two hours to build. Therefore, a pod containing about 50 sheets must be delivered every two minutes. Overhead rail systems within a facility are capable of providing these types of delivery rates.

Figure 5:
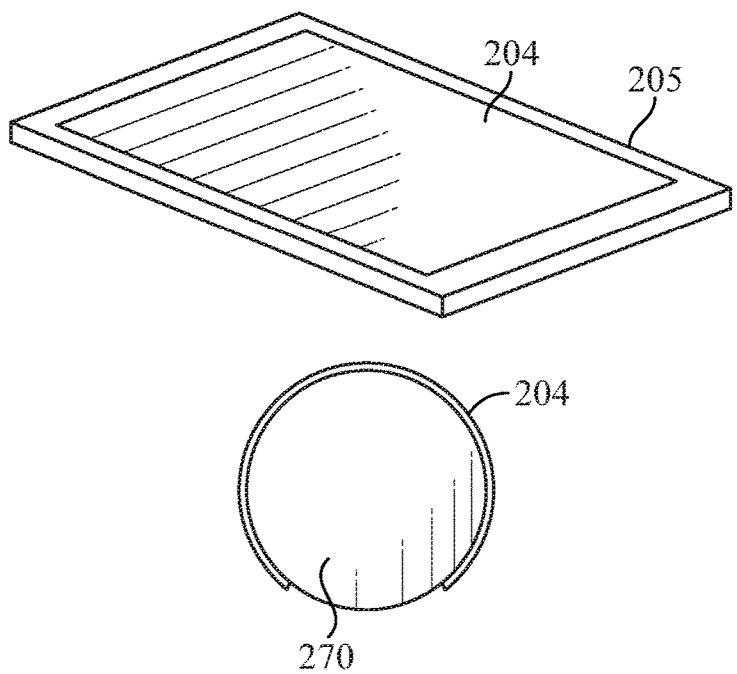
FIG. 5 is a view of framed sheet and a nip roller configured to accept the framed sheet.

Referring to FIG. 5, in some instances, the sheets 204 can be supported by a raised frame 205. The raised frame provides rigidity which aids in precisely handling the sheets 204. For instance, the sheets 204 with frames 205 can be stacked on top of the other within the pods because the frames 205 prevent the imaged layers from being contacted.

Further, a roller 270 can have recesses for aligning the frame 205 flush to the roller 270. Without a frame, the sheets 204 could have alignment holes, or could be gripped with pinch rollers to guide the sheet 204 toward the part, provided overlay control is utilized. Loading and unloading sheets 204 into the pod would also require a means to grab the sheets. However, the sheets 204 with the frames 205 can be stored and/or removed from a pod with or without shelving that is required for a sheet 204 that does not have a frame 205.

Figure 6:
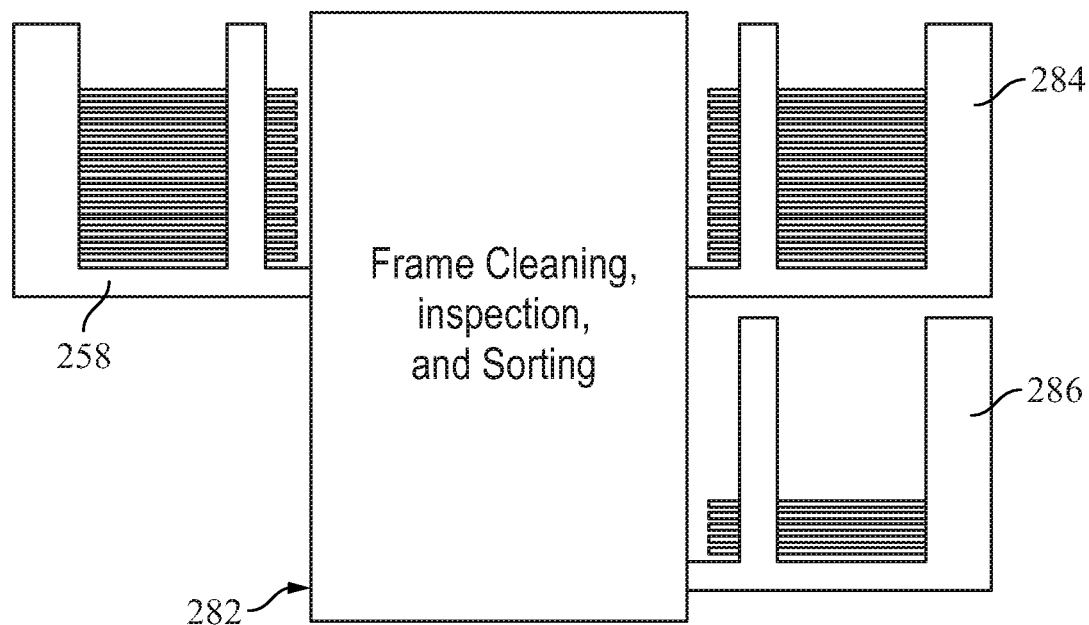
FIG. 6 is schematic view of a sheet cleaning, inspection and sorting unit.

Referring to FIG. 6, once the sheets 204 have been utilized to transfer layers of material on the 3D part being built and are stored in a pod 258, the pod 258 can be moved to a cleaning, inspection and sorting unit 282 where sheets are inspected for defects, cleaned and sorted based upon whether or not the sheets can be reused or not. Sheets that can be reused are sent to the pod 284 and sheets that cannot be reused are sent to the pod 286.

Alternatively, the cleaning, inspection and sorting unit can be utilized to determine whether a layer of material on a sheet 204 has been printed within specifications relative to the 3D digital model. Layers that are acceptable are sorted into the pod 284 and layers that are not acceptable are sorted into the pod 286. The unacceptable layers are subsequently reprinted until within acceptable specifications such that 3D parts are printed with increased accuracy.

Figure 7:
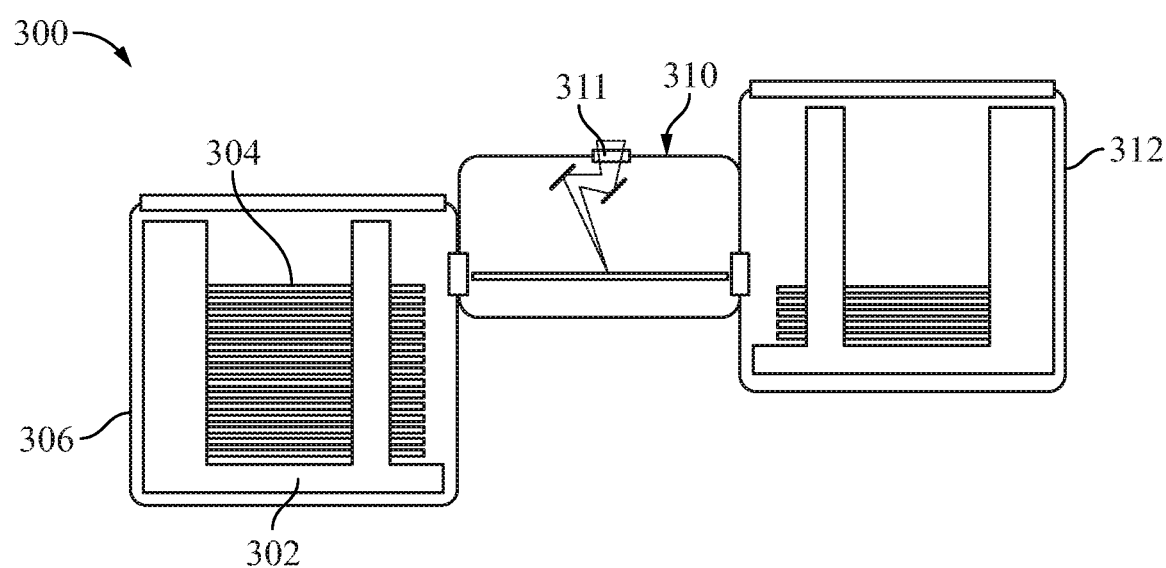
FIG. 7 is a schematic view chemical vapor deposition unit utilizing sheets as substrates for the deposited layers.

Referring to FIG. 7, a chemical vapor deposition (CVD) system is illustrated at 300. The CVD system 300 includes a pod 302 having clean sheets 304 where the pod 302 is retained in a chamber 306. A CVD unit 310 is secured to the pod 302 such that a vacuum is maintained in the CVD unit 310 when a sheet is loaded into the CVD unit 310. The CVD unit 310 has organometallic vapors that are deposited onto the sheet with a laser scanner 311 to form a layer of the part. Once the layer has been imaged onto the sheet 304, the sheet 304 is loaded into another pod 312 where a vacuum interlock maintains the vacuum in the CVD unit 310. Once the layers are printed onto the sheets 304, the sheets 304 with the layers are transported to transfuse/build process assembly, such as the assembly 250 as illustrated in FIG. 4, to print the 3D part.

The individual transfer sheet concept breaks the transfuse/build process free from the EP/print process. This decoupling of the image creation from the layer transfusion step introduces opportunities for creating multi-material parts as well as inserting other steps into the build process, and further provides a potential to increase overall manufacturing rates beyond the typical rate-limiting unit operation speed of the EP engine. In a similar way, making a separable assembly of the part-under construction, a z stage, a local environment control (temperature), positioning (in x or in xy), and control gives versatility to the transfuse/build process that is difficult in a consolidated transfuse/build process tool containing these functions internally.

The decoupling of the transfuse/build process from the EP imaging/printing process allows composite parts to be printed. For example, sheets having layers of organometallic layers can be inter-dispersed with layers of thermoplastic toner which can provide desired physical properties to the 3D part. Other non-EP layers such as graphite sheets may be introduced, with additional toner layers deposited upon the graphite, to achieve the composite part construction.

Figure 8:
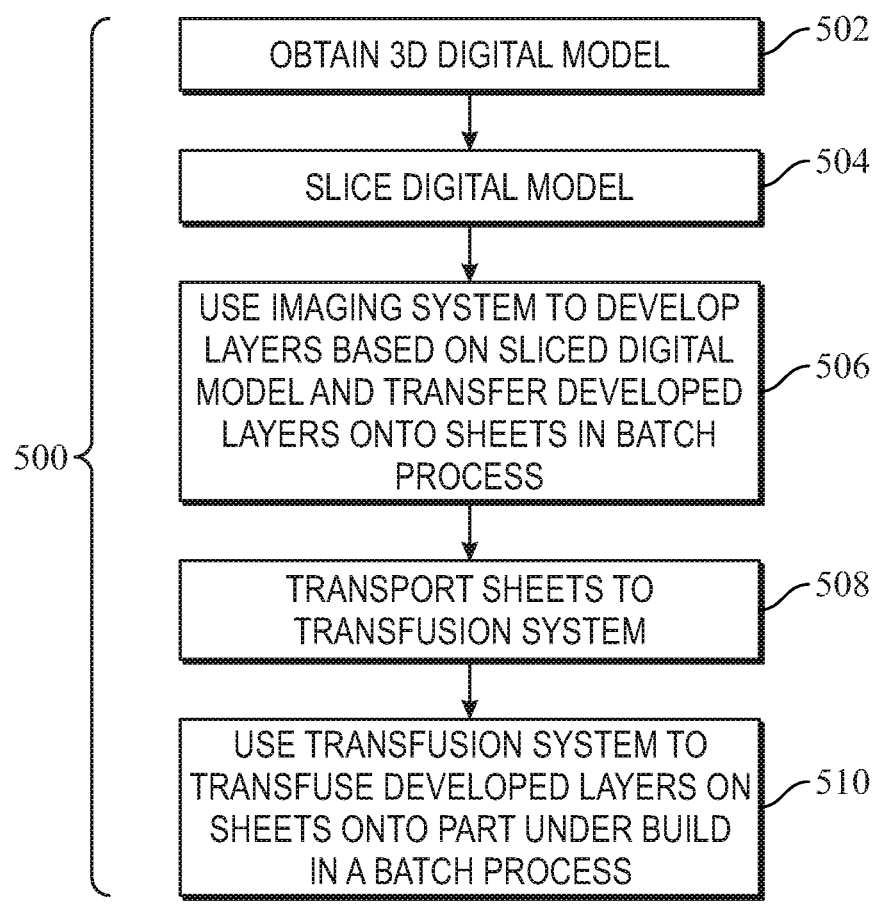
FIG. 8 is a flow chart of a method for printing a part in accordance with exemplary embodiments.

Referring now to FIG. 8, shown is an electrostatic-based layer-wise manufacturing method 500 for printing a three-dimensional part in accordance with embodiments and concepts discussed above. Disclosed methods, such as shown in FIG. 8, are implemented for example in suitably configured or programmed controllers such as controllers 236 and/or 238 in exemplary systems. As shown at block 502, digital models of the 3D parts to be printed are obtained, and at block 504, the digital models are sliced. The digital model slices can then be stored on a computer readable medium and/or output for printing using systems described above. While in some embodiments method 500 includes steps such as represented at blocks 502 and 504, in other embodiments such steps can be omitted and the method can instead begin with obtaining sliced digital model data.

At block 506, an imaging system, such as systems 200 or 200-1, is used to perform a layer imaging batch process to develop a of layers of powder material and to transfer the developed layers onto sheets 204. The sheets 204-1 with the developed layers can be planished or otherwise processed and are stored in a pod 210. As shown at block 508, the sheets 204-1 or 204-2 with the developed layers are transported to a transfusion system 250. At block 510, the transfusion system is used to transfuse the developed layers from the sheets onto a part under build in a second batch process. Thus, the imaging/developing of layers and the transfusion of the layers are performed in separate batch processes such that the imaging process need not be limited by the slower transfusion process.

Further, this method allows additional processing, such as drying or inspection, after the developed layers have been transferred to the sheets, but before the transfusion process. As discussed above, the sheets can be stored in an environmentally controlled collator pod for the further processing and for the transportation between batch processes.

The present disclosure provides advantages over prior EP additive manufacturing systems. Because the individual toner layers are printed, queued, inspected, queued, selectively replaced as required, queued to a transfuser, and potentially re-queued to a second transfuser with the part-in-process if there is a maintenance issue with the first transfuser, the required probability-of-failure for each of the steps drops from about 1:1,000,000 to about 1:10,000. This improvement comes primarily from the ability to re-work out-of-spec layers, and to switch processing between printers or assemblers when one goes off-line.

Further, the present disclosure utilizes active-feedback overlay control which is more easily controlled than utilizing feed forward control with precision belt positioning. This enables the capability to move in-process parts not only linearly, but also to many sub-stations of a multipath track or racetrack transport system, and allows for accurate overlay precision.

The present disclosure also provides system adaptability because the printing and transfusion steps are decoupled. Manufacturing systems often require specialization that optimizes a product, which requires hardware adaptation. Splitting the EP process into an image forming step, followed by a buffer, followed by transport to another piece of equipment, followed by transfuse, offers far more opportunity for modification or embellishment of the build process than a singular mechanism that performs all of the process steps in lock-step. For example, an individual part layer may have toner transfused to a portion of its area as printed by one EP system, and another portion have toner transfused from images of a different material printed by another EP system. Additionally, for example, some parts may need to be monitored and processed to optimize elongation, while others are optimized for fracture strength; these two may require different heating, cooling, and metrology hardware. For example, a transfuse assembler may require a pick-and-place tool for applications where inserts are required, such as bearing surfaces, threaded inserts, or electronics components.

In another embodiment, several layers of an EP part may be constructed, and an intermediate surface may require specialized tooling or subtraction milling operations, before further depositing additional EP layers.

The present disclosure provides a lower Johnson ratio, lower mass, lower cost relative to other EP additive manufacturing systems. The Johnson ratio is the volume of an AM tool divided by the volume of the largest buildable part; smaller is better. Combining an EP printer and a transfuse assembler literally makes an assembly that is bigger than the sum of the two components, perhaps by a factor of 2. As with most additive processes, the transfuse assembler will have a smaller footprint if the part is stationary and the transfuse apparatus moves above it. It is often the case that large machine tools cost about $10 a pound; removing the belting, the framing, and the large Z stage substantially drops the total mass.

The present disclosure provides higher productivity through load balancing. EP systems show better productivity depositing thinner layers at higher velocities. Thermal transfer has time limitations on how fast toner can be fully consolidated into strong parts. A small number of EP printers might supply a large number of transfuse builders to match the natural layer times of each.

The present disclosure allows magnification to be easier to control. Printing vertical sidewalls on a 24" part requires image magnification control to 1:20,000, which is higher than EP can guarantee. It is possible that variable tension applied to the perimeter of a Kapton sheet may allow the image to be stretched to accommodate this kind of precision. This adjustment is particularly important if the build process has to be interrupted for power failure, planing, switching assemblers, or metrology.

The toner images on sheets are also more stable than generally expected. EP-printed ABS and support toner images on FEP-coated Kapton have been taped to cardboard frames and shipped UPS without noticeable degradation of the images.

The present disclosure also allows for an increased range of transfer media. An EP manufacturing system that utilizes an FEP-on-Kapton transfer belt is unexpected. The belt balances high strength, high flexibility, low thermal mass, low electrical conductivity, low surface energy, and acceptable cost. However, it has limitations including that the belt should have more out-of-plane electrical conductivity, be insulating FEP only on one surface, be able to withstand higher temperatures than FEP can, should not be spliced, and it shouldn't ridge under tension. Switching to individual sheets (probably with some frame engagement on the periphery of a sheet) eliminates the splice, and allows a local failure of the media to be contained to a small area. For instance, temperature-insensitive photoconductor or dielectric (patterned with an electron or ion beam) may act as both image formation and transfer media in a truly compact system.

Finally, the present disclosure allows at least a portion of the sheets to be utilized to print the 3D part. For instance, when toner is transferred onto sheets of continuous fiber cloth, a laser can be utilized to define the bounding perimeter of a part layer onto the combined part and reinforcement, leaving some connected points across the perimeter for transport and alignment. The result is assembled with a standard transfuse builder, and the un-adhered surrounding material can be cut away in post process.

Although the present disclosure has been described with reference to preferred embodiments, workers skilled in the art will recognize that changes may be made in form and detail without departing from the spirit and scope of the disclosure.

What is claimed is:

1. An electrostatic-based layer-wise manufacturing method for printing a three-dimensional part, the method comprising:
   using an imaging system to perform a layer imaging batch process to develop a plurality of layers of powder material and to transfer the plurality of developed layers onto a plurality of sheets;
   transporting the plurality of sheets to a transfusion system; and
   using the transfusion system to perform a layer transfusion batch process to transfuse the developed layers from the plurality of sheets onto a part to build the part.

2. The method of claim 1, wherein using the imaging system to perform the layer imaging batch process to develop the plurality of layers of powder material and to transfer the plurality of developed layers onto the plurality of sheets further comprises using the imaging system to develop the plurality of layers and to sequentially transfer the plurality of developed layers onto the plurality of sheets, and further comprising loading the plurality of sheets sequentially into a collator pod.

3. The method of claim 2, and wherein transporting the plurality of sheets to the transfusion system further comprises transporting the collator pod loaded with the plurality of sheets to the transfusion system.

4. The method of claim 3, wherein the collator pod is environmentally controlled to provide a controlled environment, and wherein transporting the plurality of sheets to a transfusion system comprises transporting the plurality of sheets in the controlled environment.

5. The method of claim 3, and prior to transporting the collator pod loaded with the plurality of sheets to the transfusion system, further comprising placing the collator pod in a dryer and drying the plurality of layers.

6. The method of claim 1, wherein for each three-dimensional part printed, the time to complete the layer transfusion batch process is longer than the time to complete the layer imaging batch process.

7. The method of claim 1, and after transferring the plurality of developed layers onto the plurality of sheets, further comprising processing the plurality of sheets with a planisher to compress the imaged layers on the sheets.

8. The method of claim 2, wherein transferring the plurality of developed layers onto the plurality of sheets further includes supporting each of the plurality of sheets with one of a plurality of raised frames and stacking the plurality of raised frames and supported sheets within the collator pod.

9. The method of claim 2, and further comprising moving the collator pod to a cleaning, inspection and sorting unit where the plurality of sheets are inspected for defects, cleaned and sorted based upon whether or not the sheets can be reused.

10. The method of claim 2, and further comprising moving the collator pod to a cleaning, inspection and sorting unit which determines for each of the plurality of sheets whether the developed layer on the sheet is within specifications relative to a 3D digital model.

11. The method of claim 1, wherein using the plurality of sheets comprise FEP-coated Kapton pages.

12. The method of claim 1, wherein the plurality of developed layers are transferred onto the plurality of sheets at a different rate than the developed layers on the plurality of sheets are transfused onto the part.

13. The method of claim 1, and further comprising performing additional processing on the plurality of sheets with the developed layers prior to the layer transfusion batch process, the additional processing selected from planishing, drying, stretching, additional toner deposition, electrostatic charging, electrostatic discharging, metrology, quality sorting, re-work, queueing, subtractive, annealing, vapor smoothing, plating, and test structure destructive evaluation.

14. The method of claim 1, wherein using the transfusion system to perform a layer transfusion batch process to transfuse the developed layers from the plurality of sheets onto a part to build the part comprises using heat and pressure from a roller.

\* \* \* \* \*